United States Patent [19]
Ehrenbard et al.

[11] Patent Number: 4,494,242
[45] Date of Patent: Jan. 15, 1985

[54] TIMING RECOVERY IN A BAUD-RATE SAMPLED-DATA SYSTEM

[75] Inventors: Christine H. Ehrenbard, New York, N.Y.; Noah L. Gottfried, Franklin Lakes, N.J.

[73] Assignee: AT&T Bell Laboratories, Murray Hill, N.J.

[21] Appl. No.: 413,157

[22] Filed: Aug. 30, 1982

[51] Int. Cl.³ ............................................. H04L 7/00
[52] U.S. Cl. .................................. 375/118; 328/151; 328/155
[58] Field of Search ......................... 375/95, 118–120, 375/106; 307/358, 262, 269, 352, 353; 328/151, 155; 340/347 SH

[56] References Cited

U.S. PATENT DOCUMENTS 3,761,818  9/1973  Tazaki et al. ..................... 375/95
4,320,526  3/1982  Gitlin ............................... 375/118

OTHER PUBLICATIONS

K. H. Mueller and M. Muller, "Timing Recovery in Digital Synchronous Data Receivers", *IEEE Transactions on Communications*, vol. COM-24, No. 5, May 1976, pp. 516–531.

P. T. Nielsen and M. W. Gram, "A Digital Hybrid for Two–Wire Digital Subscriber Loops", *National Telecommunications Conference*, 1978, pp. 21.2.1–21.2.7.

Primary Examiner—Benedict V. Safourek
Attorney, Agent, or Firm—Lucian C. Canepa

[57] ABSTRACT

In a high-speed digital data system, it is advantageous to sample incoming data pulses at the baud-rate rather than at the Nyquist-rate. In such a system of the type that includes a dispersive channel (e.g., an unloaded subscriber twisted pair with bridged taps), effective baud-rate sampling and reliable pulse recovery at a receiver depend on the availability of a suitable pulse synchronization or timing recovery technique. In accordance with this invention, timing recovery is based on the recognition that the precursor portion of the response of the channel is relatively invariant and predictable. By selecting a specified threshold point in a small-amplitude region of the precursor portion, a basis is provided for generating accurated bipolar error signals that insure consistent baud-rate sampling of received pulses.

8 Claims, 2 Drawing Figures

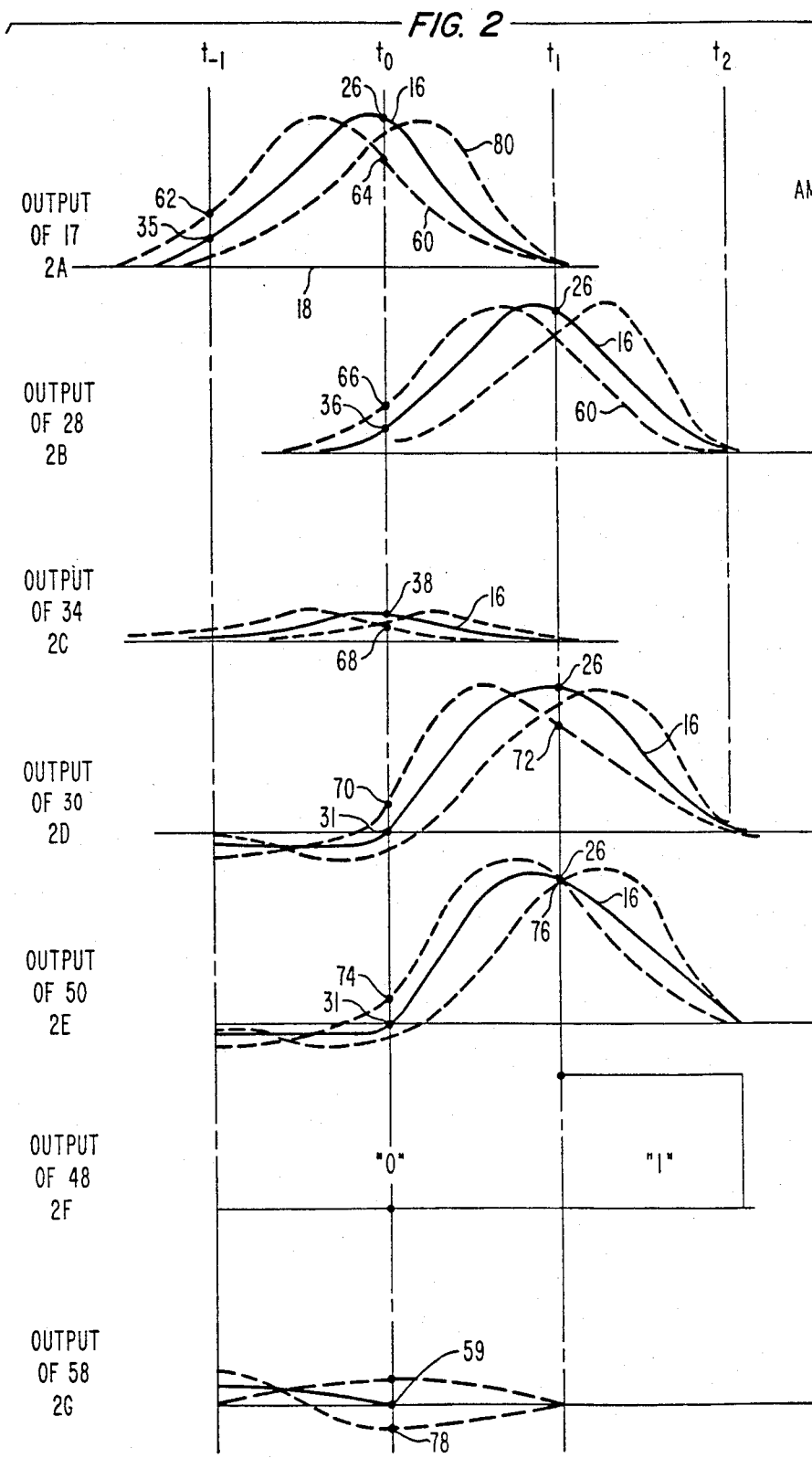

TIMING RECOVERY IN A BAUD-RATE SAMPLED-DATA SYSTEM

BACKGROUND OF THE INVENTION

This invention relates to a baud-rate sampled-data system and, more particularly, to a method and circuitry for achieving timing recovery in such a system.

Timing recovery in digital synchronous data systems is a critical function. In the receiver of such a system, timing signals must be continuously adjusted in frequency and phase to compensate for drift that typically occurs between clocks utilized in the transmitter and receiver of the system. In that way, the respective sampling instants of successive received data signals can be optimized. With such optimization, the likelihood of being able to accurately reconstruct high-speed data received from a lossy transmission channel is significantly enhanced.

For a Nyquist-rate sampled-data system, conventional timing recovery techniques are available. Moreover, techniques have been proposed for achieving timing recovery in a baud-rate sampled-data system. These latter techniques are described, for example, in "Timing Recovery in Digital Synchronous Data Receivers", by K. H. Mueller and M. Muller, *IEEE Transactions on Communications*, Vol. COM-24, No. 5, May 1976, pp. 516-531, and in "A Digital Hybrid for Two-Wire Digital Subscriber Loops", by P. T. Nielsen and M. W. Gram, *National Telecommunications Conference*, 1978, pp. 21.2.1-21.2.7. These known baud-rate techniques are based on the assumption that the so-called post-cursor response of the channel is relatively invariant and predictable. But for a data system that includes a dispersive channel, such as an unloaded twisted-pair with bridged taps (of the type employed in a telecommunications network), this assumption is often an undependable basis for reliable timing recovery. In such a network, the post-cursor behavior of the channel is typically variable and unpredictable.

Accordingly, workers in the art have continued to search for reliable approaches on which to base timing recovery in a baud-rate sampled-data system of the type that includes a dispersive channel. It was recognized that such a search, if successful, would be one of the keys to realizing a high-speed full-duplex data system having considerable practical importance.

SUMMARY OF THE INVENTION

Hence, an object of the present invention is an improved baud-rate data system of the type that includes a dispersive channel. More specifically, an object of this invention is a method and circuitry for achieving timing recovery in such a system.

Briefly, these and other objects of the present invention are realized in a specific illustrative data transmission system of the full-duplex type in which the precursor portion of the signal response of a dispersive channel is utilized as a basis for recovering timing signals from received data pulses. In particular, sampling is controlled to occur at a non-zero point in a relatively low-amplitude region of the precursor portion of the channel response. This low-amplitude point is selected to occur at a precursor value that is a fixed relatively small percentage of the sample amplitude of the pulse at or near its peak point one time slot after the low-amplitude point. It is then possible to detect deviations above and below the prescribed sampling points, thereby to provide bipolar error signals that serve to insure that optimal or near-optimal baud-rate sampling of the received data pulses is consistently maintained.

In a particular illustrative system embodiment of the present invention, each received data pulse is sampled at or about the specified low-amplitude point of the precursor. This sample is delayed by one time slot and applied to one input of a difference amplifier. Additionally, the following sampled value, which is obtained at or about the pulse peak, is multiplied by a fixed fractional value and applied to another input of the amplifier. The fixed value is a predetermined multiplier that constitutes the chosen ratio of the value of the low-amplitude sample to the peak or near-peak-point sample amplitude when the sampling operation is being carried out in a specified phase relationship with respect to the received pulse.

In the illustrative system, the product of the chosen fixed fractional value and the peak or near-peak sample value is compared with the value of the sample obtained at the precursor point after the value of the received data pulse is subtracted out. Ideally, these values will be equal. If they are, no error signal for timing correction will be generated. But, if the values are not equal, a deviation from the ideal timing of the sampling operation with respect to the received pulse is thereby indicated. More specifically, an error signal of one polarity is provided if sampling of the pulse occurs too soon and an error signal of the other polarity is provided if sampling occurs too late. In turn, the error signals are utilized to vary the phase of the sampling operation with respect to the waveform of the received pulse. With such a timing capability, the system is able to accurately perform the other standard filtering functions required to reconstruct high-speed data received from a lossy transmission channel.

BRIEF DESCRIPTION OF THE DRAWING

A complete understanding of the present invention and of the above and other features thereof may be gained from a consideration of the following detailed description presented hereinbelow in connection with the accompanying drawing, in which:

and FIG. 2 depicts signals at various points in the FIG. 1 system.

DETAILED DESCRIPTION

Figure 1:
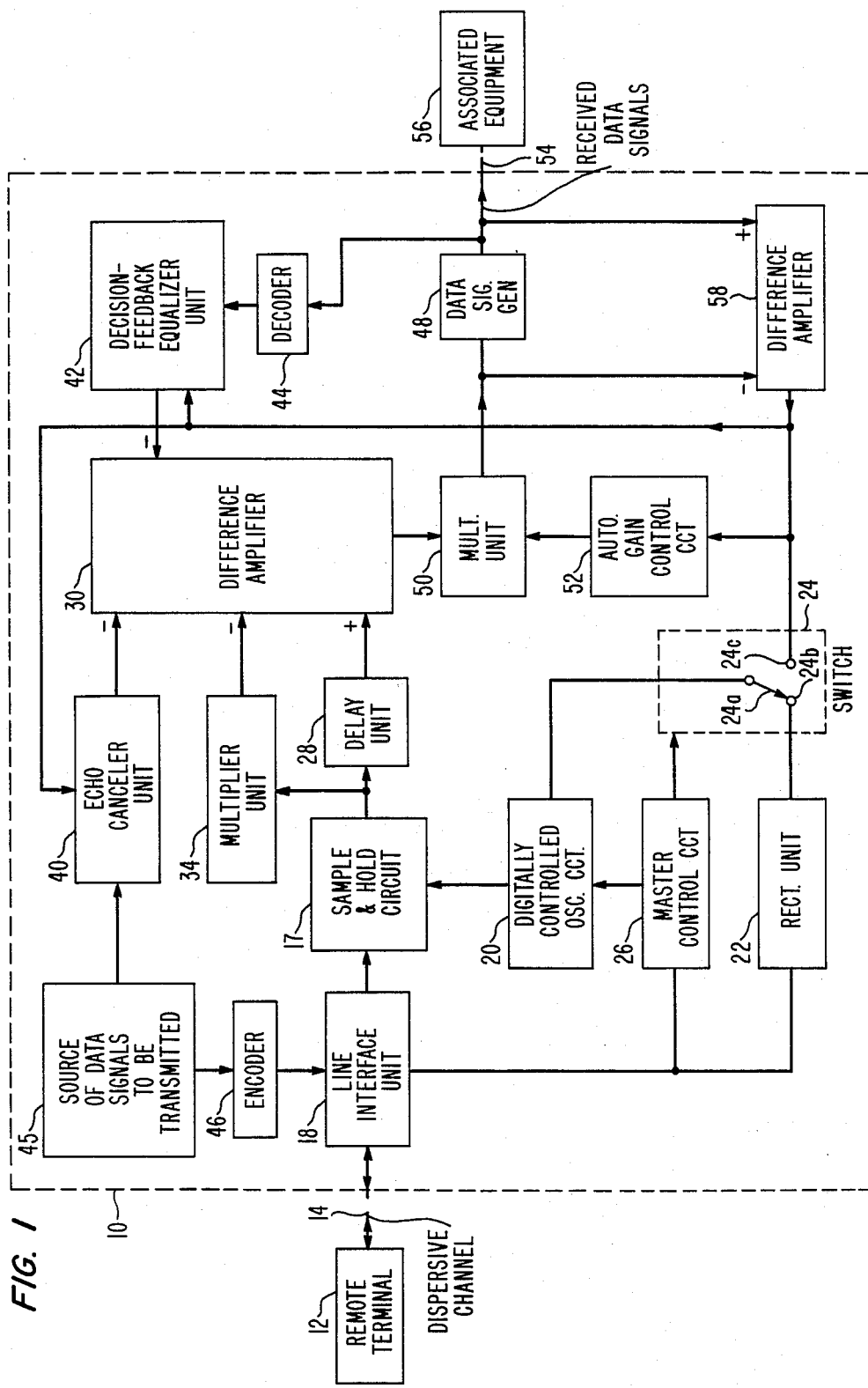
FIG. 1 is a block-diagram representation of a specific illustrative baud-rate sampled-data system that embodies the principles of the present invention.

FIG. 1 shows a specific illustrative digital data system in which applicants' inventive timing recovery technique is embodied. Each of the individual blocks included in FIG. 1 represents a standard circuit known in the art. By interconnecting the blocks in the particular manner shown, a unique receiving and transmitting terminal 10 is formed. The terminal 10 is designed to communicate with a remote receiving and transmitting terminal 12.

The terminals 10 and 12 of FIG. 1 are interconnected by a dispersive channel 14. The channel 14 comprises, for example, an unloaded subscriber twisted pair with bridged taps such as is utilized in the local loop of a telecommunications network.

Information to be transmitted between the terminals 10 and 12 via the channel 14 includes high-speed data. Illustratively, it will be assumed herein that data signals are to be sent over the channel 14 in a full-duplex manner at a pulse or baud-rate of approximately 80 kilopulses per second (kps). In a sampled-data system, the accurate reconstruction of such high-speed signals sent over relatively long lengths (for example, 18 kilofeet) of a twisted-pair channel is a formidable task. Noise and linear distortion introduced by the channel 14 cause the received signals to be significantly different from those that are transmitted.

Moreover, phase variations inevitably occur between the clock or timing signals respectively utilized in the terminals 10 and 12 of FIG. 1. If not compensated for, as described in detail later below, these variations can affect the ability of the terminals to consistently sample received signals at prescribed points. In turn, the ability of the terminal to accurately extract information from distorted signals received from a lossy channel can be thereby deleteriously affected.

By way of example, it will be assumed herein that data signals are transmitted over the dispersive channel 14 of FIG. 1 in a baseband format of, for example, either the standard alternate-bipolar type or the standard class-4 partial response type. Nyquist-rate sampling techniques for achieving timing recovery in such a system are known. For an 80 kps data transmission rate, the Nyquist sampling rate would be at least 160 kilosamples per second. But these known Nyquist-rate techniques require considerably more equipment than does a system in which received signals are reconstructed and sampled only at the baud rate (i.e., at a rate of only 80 kilosamples per second). In practice, a baud-rate sampled-data system requires only about one-half the equipment of a Nyquist-rate sampled-data system. The advantage and importance of being able to reliably recover clock or timing signals in a baud-rate system are therefore apparent. An illustrative system for simply and reliably accomplishing such recovery is depicted in FIG. 1 and described later below.

Applicants' unique timing recovery technique is based on their recognition that the precursor portion of each data signal processed by the terminal 10 can be a relatively reliable basis for achieving timing recovery. In particular, applicants recognized that the precursor portion of the channel response to each such signal is relatively invariant and predictable. Applicants recognized that all or virtually all of the inter-symbol or inter-pulse interference in a received data signal sequence occurs from the postcursor portion of each pulse. By in effect removing postcursor inter-symbol interference as a factor during the processing operation, in the manner specified later below, applicants were able to maintain successive precursor portions of the received signal sequence as reliable bases for timing recovery.

FIG. 2A shows an idealized pulse 16 that is a modified version of a data pulse received by the terminal 10 from the channel 14. The left-hand portion of the pulse 16, that is, the portion that extends between reference or zero-amplitude line 18 and the peak of the pulse 16, constitutes the so-called precursor portion thereof. The remaining or right-hand portion of the received pulse (but modified to remove inter-symbol interference, as shown in FIG. 2A) constitutes the postcursor portion of the pulse.

Ideally, sampling of the received data pulse 16 of FIG. 2A should occur at or near the peak thereof. In that way, the practical likelihood is enhanced that at the sampling instant a correct determination can be made that the complex waveform received from the channel constitutes a true pulse (say a "1" signal representation) rather than only noise.

In FIG. 2A, sampling occurs at the times designated $t_{-1}$, $t_0$, $t_1$ and $t_2$. Sampling of the pulse 16 is shown by way of an illustrative example as occurring slightly off the peak thereof, at time $t_0$. Other pulses, not shown in FIG. 2, are sampled slightly off their respective peaks at $t_{-1}$, $t_1$ and $t_2$. For an 80 kps pulse rate, the intervals $t_{-1}$-to-$t_0$, $t_0$-to-$t_1$ and $t_1$-to-$t_2$ are each 12.5 microseconds.

The exact location of the peak or near-peak sampling point is a function of the particular channel response and pulse characteristics of the system. The peak or near-peak point is selected such that the precursor portion of the pulse exactly one sampling interval before the selected point has a sufficiently large non-zero value to provide a basis for generating both positive and negative error signals in response to expected timing variations that occur in the system. Usually, this requires that sampling occur slightly after the peak of the received pulse. (In practice, this post-peak point is also relatively invariant and predictable). But, in some cases, the channel response and pulse characteristics are such that sampling at exactly the peak of the pulse will provide the required non-zero precursor sample at $t_{-1}$.

Signals from the channel 14 of FIG. 1 are applied to a standard sample and hold circuit 17 in the terminal 10 via a conventional line interface unit 18. The unit 18 comprises, for example, a hybrid of known design.

Timing of the sampling operation carried out in the circuit 17 is controlled by clock signals applied to the circuit 17 from a standard digitally controlled oscillator circuit 20. Initially, during a start-up synchronization period, the digital oscillator 20 is configured in response to signals from a master control circuit 26 to be a standard phase-locked loop. As a result, the timing of the circuit 20 is established in a conventional known way. This is done, for example, by sending a 40 kilohertz sine wave signal from the remote terminal 12 via the channel 14 and the line interface unit 18 to a conventional unit 22. The unit 22 applies a rectified version of the received signal via a switch 24 to the digital oscillator circuit 20. In practice, the switch 24 is advantageously a standard electronic element whose state is controlled by the master control circuit 26. In response to the aforespecified sine wave signal, the circuit 26 controls the switch 24 to be in its depicted state in which arm 24a engages contact 24b.

Following the initialization procedure, the circuit 26 controls the arm 24a of the switch 24 to move into engagement with contact 24c. In addition, the digital oscillator 20 is then controlled and configured by the circuit 26 to function as an oscillator whose frequency moves up or down depending on the accumulation of a number of error signals, as described below.

At that point, the terminal 10 is ready to process received data signals in accordance with the principles of the present invention. Initially, sampling of a received signal such as the pulse 16 shown in FIG. 2A occurs, for example, slightly off the peak thereof, at time $t_0$. Shifts that may occur in this desired timing relationship are reliably detected and corrected by the system depicted in FIG. 1, as will be described below.

For the purpose of a specific illustrative example, assume that the data pattern received from the remote terminal 12 is a stream of "0" pulses, followed by a single "1" pulse, followed by another stream of "0"

pulses. Then the precursor effect of the "1" pulse on the preceding "0" pulse is as shown at $t_{-1}$ of pulse 16 in FIG. 2A.

At time $t_{-1}$ (FIG. 2), the output of the sample and hold circuit 17 (FIG. 1) is assmed to be a zero-amplitude signal level plus a precursor from the following unity-amplitude pulse. This precursor level, which is represented by point 35 on the pulse 16 of FIG. 2A, is then delayed by unit 28 by one pulse interval and applied to one input of a standard difference amplifier 30 and is represented by point 36 of FIG. 2B. For the particular pulse 16, the signal amplitude at the point 36 is 0.2 times that of the signal amplitude at the near-peak sampling point 26.

The output of the sample and hold circuit 17 of FIG. 1 is also applied to a conventional multiplier unit 34. In the unit 34, at time $t_0$, the unity-amplitude signal level represented by the point 26 of FIG. 2A is multiplied by a factor less than unity whose value in practice is typically selected to be, for example, a fixed parameter in the range 0.05-to-0.3, depending in a particular system on the nature of the particular pulses received from the channel 14. Herein, for the specific illustrative pulse example depicted in FIG. 2, the unit 34 is designed to multiply the input applied thereto by the factor 0.2. This particular factor corresponds to the ratio of the signal level amplitude of the pulse 16 at $t_{-1}$ (point 35 in FIG. 2A) to the signal level amplitude of the pulse 16 at $t_0$ (point 26 in FIG. 2A).

Accordingly, for a correctly timed sampling operation, the output of the multiplier unit 34 at time $t_0$ is a signal level whose amplitude is 0.2 times that of the unity-amplitude level 26 (FIG. 2A) at time $t_0$. This reduced level, which is represented by point 38 in FIG. 2C, is also applied to the difference amplifier 30. Since the aforementioned delayed input to the amplifier 30 at time $t_0$ is the specified precursor signal level (point 36 in FIG. 2B), it is apparent that in this case wherein the received data pulse is zero, the difference between these two particular inputs to the amplifier 30 will be zero.

Hence, as indicated by point 31 on the waveform 16 of FIG. 2D, for a zero-amplitude data level, no net signal is provided at $t_0$ at the output of the difference amplifier 30 as a result of comparing the signal levels denoted by points 36 and 38 of FIGS. 2B and 2C, respectively. This indicates that sampling of the received pulse is being carried out in accordance with a prespecified timing relationship.

If the data pattern received from the remote terminal 12 is such that it contains multiple "1s" in a row, the output of the difference amplifier 30 represents the unity-amplitude data level. The information for timing synchronization is thus derived from the unit 58 after the data level is removed from the error signal, as discussed below.

Two additional inputs to the difference amplifier 30 are shown in FIG. 1. One of these inputs is derived from the output of an echo canceler unit 40, whereas the other comes from the output of a decision-feedback equalizer unit 42.

The echo canceler unit 40 is adapted to eliminate reflections or echoes that might otherwise occur in the terminal 10 when data signals to be transmitted are applied from source 45 via an encoder 46 and the interface unit 18 to the channel 14. The unit 42, which is adapted to remove the effects of postcursor inter-symbol interference from received data signals, responds via a decoder 44 to data signals appearing at the output of data signal generator 48.

The output of the multiple-input difference amplifier 30 is applied to a standard multiplier unit 50. In turn, the multiplication factor of the unit 50 is controlled by a conventional high-speed automatic-gain-control circuit 52. In that way, the signal levels obtained by sampling received pulses are all adjusted, if necessary, to common standard amplitudes. These standard amplitudes correspond to the particular levels provided by the data signal generator 48 on output line 54 to associated equipment 56 to indicate "0" and "1" signals, respectively.

In the current example, a zero-amplitude signal level represented by the point 31 of the pulse 16, as shown in FIG. 2E, is applied to the data signal generator 48 at time $t_0$. The generator 48 responds thereto by applying a zero-amplitude signal (indicative of, for example, a "0" signal) to the output line 54 (see FIG. 2F). These two specified zero-amplitude signals are also respectively applied to the inputs of a standard difference amplifier 58. As a result of this particular assumed condition, no error signal appears at the output of the amplifier 58. This is indicated by point 59 in FIG. 2G. Accordingly, the timing of the sample and hold circuit 17 by the circuit 20 is not changed.

Similarly, as represented by the point 26 of the pulse 16 of FIG. 2E, a positive standard-amplitude signal level is applied to the data signal generator 48 at time $t_1$. The generator 48 responds thereto by applying a positive standard-amplitude signal (indicative of a "1" signal) to the output line 54 (see FIG. 2F). These two identical standard-amplitude signals are also applied to the amplifier 58. In response thereto, the amplifier 58 does not provide an error signal. Hence, as before, the timing of the sampling operation in the terminal 10 is not changed.

Assume now that an undesired timing variation occurs in the FIG. 1 system. Unless corrected, such a variation can in practice seriously degrade the signal-to-noise discrimination capabilities of the system. In particular, assume that a change occurs in the aforespecified timing relationship between a received data signal and sampling instants $t_{-1}$, $t_0$, $t_1$ and $t_2$ (FIG. 2). For example, assume that the sampling instants occur as indicated in FIG. 2A for received pulse 60.

As is evident, the pulse 60 shown in FIG. 2A is sampled at $t_{-1}$ at a point 62 on the precursor portion thereof. The amplitude corresponding to the point 62 is greater than that of the previously discussed point 35 associated with the properly timed pulse 16. By way of example, assume that the signal level at the point 62 is 0.3 times the aforespecified unity-amplitude signal level. Further, it is seen that the pulse 60 is sampled at $t_0$ at a point 64 whose amplitude is less than that of the near-peak point 26 of the pulse 16. For example, assume that the signal level at the point 64 is 0.8 times the unity-amplitude level. It is apparent that such variations from the previously specified case can reach a point where the system is unable to distinguish between "0" and "1" signals with a high degree of certainty.

In accordance with the principles of the present invention, the timing of the sampling operation in the FIG. 1 system is gradually altered with respect to the pulse 60 of FIG. 2A. After a series of alterations, the phase relationship between the pulse 60 and the sampling instants will correspond to that depicted in FIG. 2A for the pulse 16.

Spaced-apart samples of the received pulse 60 are each delayed by one pulse interval by the unit 28 of FIG. 1. Also, the undelayed samples are each reduced in amplitude in the multiplier unit 34 by the fixed predesigned factor 0.2. As a result, incorrect signal levels derived from the pulse 60 are applied to the difference amplifier 30. More specifically, the delayed level, represented by the point 66 at $t_0$ in FIG. 2B, has the value 0.3. The undelayed but reduced level has the value 0.16 (0.2 times 0.8), as represented by the point 68 at $t_0$ in FIG. 2C.

In response to these assumed signal levels, the amplifier 30 provides a positive output signal level whose value is 0.14 (0.3 minus 0.16). This output level is represented by point 70 in FIG. 2D.

Subsequently, in the unit 50 of FIG. 1, the signal level corresponding to the point 70 (FIG. 2D) and the signal level at point 72 at $t_1$ are each multiplied to bring the level at the point 72 to the previously specified standard-amplitude value. As a result, slightly increased levels, respectively represented by points 74 and 76 in FIG. 2E (point 76 is coincident with the point 26), are applied to the data signal generator 48.

In response thereto, the generator 48 provides at $t_0$ a zero-amplitude signal, as indicated by FIG. 2F. This signal is applied both to the output line 54 and to the positive terminal of the difference amplifier 58. At the same time, the previously specified positive signal level (point 74) is applied to the negative terminal of the difference amplifier 58 from the multiplier unit 50. As a result, the amplifier 58 provides at its output a negative-level error signal whose value is represented by point 78 in FIG. 2G. As indicated in FIG. 1, this error signal is applied to the circuit 52 and to the units 40 and 42. Additionally, for timing recovery purposes, the error signal is applied via the switch 24 to the digitally controlled oscillator circuit 20.

In practice, the response time of the automatic-gain-control circuit 52 is designed to be relatively fast. In particular, this response time is designed to be at least about an order of magnitude less than the response time of the timing recovery circuitry in the terminal 10. In that way, the near-peak signal level represented by points 26 and 76 in FIG. 2E remains at the specified standard-amplitude value as the sampling phase changes during timing recovery.

In the digitally controlled oscillator circuit 20, error signals are accumulated. Negative such signals cause the sampling frequency to be raised whereas positive such signals cause the sampling frequency to be lowered. In that way, the digitally controlled oscillator circuit 20 is made to converge on the desired clock phase to re-establish the predetermined sampling relationship with respect to received data pulses.

FIG. 2 also depicts an example in which timing in the FIG. 1 system has drifted to the point where a received data pulse is sampled before the peak thereof. This is illustrated by pulse 80 shown in FIG. 2A.

The response of the FIG. 1 system to the sampling case represented by the pulse 80 in FIG. 2A is to generate a positive error signal at the output of the difference amplifier 58. Such positive error signals are accumulated in the circuit 20. And, as indicated above, the consequent effect of such signals is to lower the sampling frequency of the circuit 17. In that way, a prespecified timing relationship is re-established in the depicted system.

Finally, it is to be understood that the above-described techniques and arrangements are only illustrative of the principles of the present invention. In accordance with these principles, numerous modifications and alternatives may be devised by those skilled in the art without departing from the spirit and scope of the invention.

What is claimed is:

1. In combination in a baud-rate sampled-data terminal adapted to be connected to a dispersive channel,
    means responsive to data pulses from said channel for sampling each such pulse at said baud-rate to provide a relatively low-amplitude sampled level representative of a low-amplitude non-zero point on the precursor of said pulse and a relatively high-amplitude sampled level representative of the peak or a near-peak point of said same pulse,
    means responsive to the output of said sampling means for delaying each of said sampled levels by one sampling interval,
    means also responsive to the output of said sampling means for multiplying each of said sampled levels by a fixed factor that is the ratio of said low-amplitude level to said high-amplitude level when sampling of pulses is occurring in a prespecified correctly timed manner, and
    means for comparing the delayed low-amplitude level with the multiplied version of the high-amplitude level to provide an indication of whether or not sampling is occurring in the prespecified manner.

2. A combination as in claim 1 further including
    means responsive to the indication provided by said comparing means for generating an error signal of one polarity in response to the delayed low-amplitude level being less than the multiplied version of the high-amplitude level and for generating an error signal of the other polarity in response to the delayed low-amplitude level being greater than the multiplied version of the high-amplitude level.

3. A combination as in claim 2 still further including
    means responsive to accumulated error signals of one polarity for gradually increasing the frequency at which pulses are sampled by said sampling means and responsive to accumulated error signals of the other polarity for gradually decreasing the frequency at which pulses are sampled by said sampling means.

4. A combination as in claim 3 in which said means responsive to accumulated error signals comprises a digitally controlled oscillator circuit.

5. A timing recovery method for a baud-rate sampled-data system that processes data pulses received from a dispersive channel, said method comprising the steps of
    sampling each received pulse at or near the peak thereof and at a low-amplitude non-zero point of the precursor portion thereof,
    multiplying the peak or near-peak sample by a prespecified factor,
    delaying the precursor sample by one sampling interval,
    comparing the multiplied sample with the delayed sample,
    generating an error signal in response to the results of the comparison step, and
    applying said error signal to a clock circuit to control the timing of said sampling step.

6. A method as in claim 5 wherein error signals of one polarity are accumulated to gradually increase the frequency of said clock circuit and error signals of the other polarity are accumulated to gradually decrease the frequency of said clock circuit.

7. A baud-rate sampled-data timing recovery circuit adapted to receive baseband data pulses comprising
means for sampling each received baseband pulse at or near its peak and at a relatively low-amplitude non-zero point of its precursor,
means for delaying each of the samples provided by said sampling means by one sampling interval,
means for multiplying each of the samples provided by said sampling means by a specified factor that comprises the ratio of the precursor sample level to the peak or near-peak sample level when sampling is being carried out in accordance with a prespecified timing relationship,
means for comparing the delayed precursor sample level with the multiplied peak or near-peak sample level and providing an output signal indicative of any difference therebetween, and
means responsive to any output signal provided by said comparing means for controlling the timing of said sampling means to insure that sampling is carried out in accordance with the prespecified timing relationship.

8. A circuit as in claim 7 in which said controlling means comprises a digitally controlled oscillator that accumulates output signals of one polarity for causing the frequency at which sampling occurs to gradually increase and that accumulates signals of the other polarity for causing the frequency at which sampling occurs to gradually decrease.

* * * * *